(12) United States Patent
Song et al.

(10) Patent No.: US 11,815,759 B2
(45) Date of Patent: Nov. 14, 2023

(54) POLARIZING PLATE, LIQUID CRYSTAL PANEL AND DISPLAY DEVICE

(71) Applicant: LG CHEM, LTD., Seoul (KR)

(72) Inventors: Intaek Song, Daejeon (KR); Jung Hyun Seo, Daejeon (KR); Hanna Lee, Daejeon (KR); Yeongrae Chang, Daejeon (KR); Jaeyoung Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 16/964,724

(22) PCT Filed: Oct. 11, 2019

(86) PCT No.: PCT/KR2019/013377
§ 371 (c)(1),
(2) Date: Jul. 24, 2020

(87) PCT Pub. No.: WO2020/080757
PCT Pub. Date: Apr. 23, 2020

(65) Prior Publication Data
US 2020/0355961 A1  Nov. 12, 2020

(30) Foreign Application Priority Data
Oct. 18, 2018  (KR) .................. 10-2018-0124554

(51) Int. Cl.
*G02F 1/1335* (2006.01)
*G02B 1/14* (2015.01)
(Continued)

(52) U.S. Cl.
CPC .......... *G02F 1/133528* (2013.01); *G02B 1/11* (2013.01); *G02B 1/111* (2013.01);
(Continued)

(58) Field of Classification Search
CPC ......... G02F 1/133528; G02F 1/133502; G02B 1/111; G02B 5/3025; G02B 5/3033; C09K 2323/03
See application file for complete search history.

(56) References Cited

U.S. PATENT DOCUMENTS 7,960,018 B2   6/2011 Yoneyama et al.
8,304,025 B2   11/2012 Yoneyama et al.
(Continued)

FOREIGN PATENT DOCUMENTS

CN   102326118 A   1/2012
CN   102472842 A   5/2012
(Continued)

OTHER PUBLICATIONS

International Search Report and Written Opinion issued for International Application No. PCT/KR2019/013377 dated Feb. 6, 2020, 11 pages.
(Continued)

*Primary Examiner* — Sophie Hon
(74) *Attorney, Agent, or Firm* — ROTHWELL, FIGG, ERNST & MANBECK, P.C.

(57) ABSTRACT

The present disclosure relates to a polarizing plate including: a polarizer, and a first hard coating layer having a thickness of 10 um or less and an anti-reflection film which are positioned so as to face each other around the polarizer, wherein the anti-reflection film includes a light-transmitting substrate and a second hard coating layer, and wherein a ratio (a/b) of a transmittance (a) at a wavelength of 400 nm of the second hard coating layer to the transmittance (b) at a wavelength of 500 nm of the second hard coating layer is 0.95 or less, or 0.85 to 0.95.

14 Claims, 3 Drawing Sheets

(51) Int. Cl.
  *G02B 1/111*   (2015.01)
  *G02B 1/11*    (2015.01)
  *G02B 5/30*    (2006.01)
(52) U.S. Cl.
  CPC ............ *G02B 1/14* (2015.01); *G02B 5/3033* (2013.01); *G02F 1/133502* (2013.01); *C09K 2323/03* (2020.08)

(56) References Cited

U.S. PATENT DOCUMENTS

| | | | |
|---|---|---|---|
| 10,240,033 B2 | 3/2019 | Nimura et al. | |
| 2002/0110692 A1* | 8/2002 | Suzuki .................. | C08J 7/0427 428/411.1 |
| 2007/0184212 A1* | 8/2007 | Nimura ................ | G02B 5/3033 428/1.31 |
| 2009/0086318 A1* | 4/2009 | Yaegashi ............... | G02B 1/105 359/580 |
| 2009/0087617 A1* | 4/2009 | Suzuki ............... | B29D 11/0073 428/147 |
| 2012/0189828 A1 | 7/2012 | Inomata et al. | |
| 2013/0115469 A1 | 5/2013 | Hayashi et al. | |
| 2013/0162930 A1* | 6/2013 | Shin .................... | G02F 1/13362 359/489.07 |
| 2014/0227482 A1* | 8/2014 | Shibata .................. | G02B 1/04 428/141 |
| 2015/0200315 A1 | 7/2015 | Mukai | |
| 2015/0234097 A1 | 8/2015 | Kang et al. | |
| 2016/0231486 A1 | 8/2016 | Lee et al. | |
| 2017/0363778 A1* | 12/2017 | Lee .......................... | G02B 1/04 |
| 2018/0196169 A1 | 7/2018 | Choi et al. | |
| 2018/0217297 A1 | 8/2018 | Kim et al. | |
| 2019/0129071 A1 | 5/2019 | Lee et al. | |

FOREIGN PATENT DOCUMENTS

| | | | | |
|---|---|---|---|---|
| CN | 102985498 A | 3/2013 | | |
| CN | 104661814 A | 5/2015 | | |
| CN | 107111177 A | 8/2017 | | |
| CN | 107921757 A | 4/2018 | | |
| JP | 2003-227932 A | 8/2003 | | |
| JP | 2004-162000 A | 6/2004 | | |
| JP | 2004-163752 A | 6/2004 | | |
| JP | 2007-293301 A | 11/2007 | | |
| JP | 2009-053249 A | 3/2009 | | |
| JP | 2012-056220 A | 3/2012 | | |
| JP | 2012-521578 A | 9/2012 | | |
| JP | 2014-069454 A | 4/2014 | | |
| JP | 2016-014770 A | 1/2016 | | |
| JP | 2016014770 A | * | 1/2016 | ........... G02F 1/1335 |
| JP | 2017-096986 A | 6/2017 | | |
| JP | 2018-022060 A | 2/2018 | | |
| JP | 2018-525667 A | 9/2018 | | |
| JP | 7164124 B2 | * | 11/2022 | ............... C09D 7/61 |
| KR | 10-2007-0115119 A | 12/2007 | | |
| KR | 10-2012-0052277 A | 5/2012 | | |
| KR | 10-2013-0045346 A | 5/2013 | | |
| KR | 10-2014-0031103 A | 3/2014 | | |
| KR | 10-2015-0041780 A | 4/2015 | | |
| KR | 10-2015-0099459 A | 8/2015 | | |
| KR | 10-2015-0120264 A | 10/2015 | | |
| KR | 10-2016-0083652 A | 7/2016 | | |
| KR | 10-2016-0098751 A | 8/2016 | | |
| KR | 10-2017-0103681 A | 9/2017 | | |
| KR | 10-2017-0142508 A | 12/2017 | | |
| KR | 10-2018-0025866 A | 3/2018 | | |
| KR | 10-2018-0075316 A | 7/2018 | | |
| KR | 102363874 B1 | * | 2/2022 | ............... C09D 7/61 |
| WO | 2018-124699 A1 | 7/2018 | | |

OTHER PUBLICATIONS

International Search Report issued for International Application No. PCT/KR2019/013680 dated Feb. 6, 2020, 4 pages.

* cited by examiner

[FIG. 1]
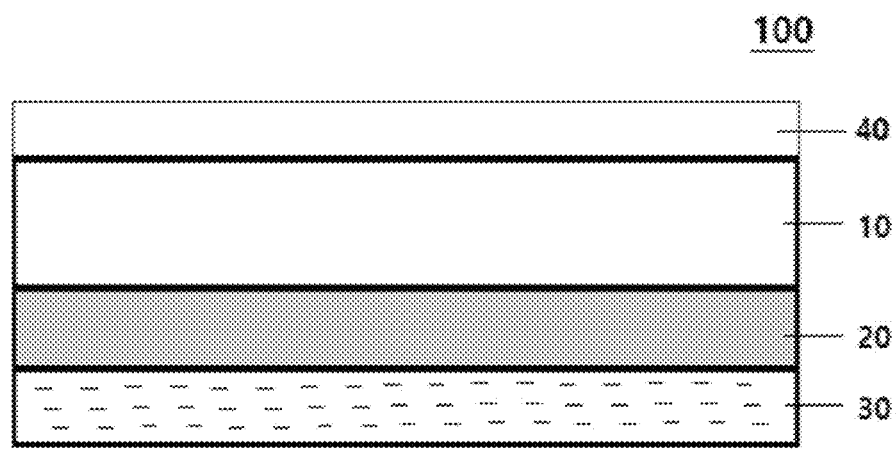

[FIG. 2]
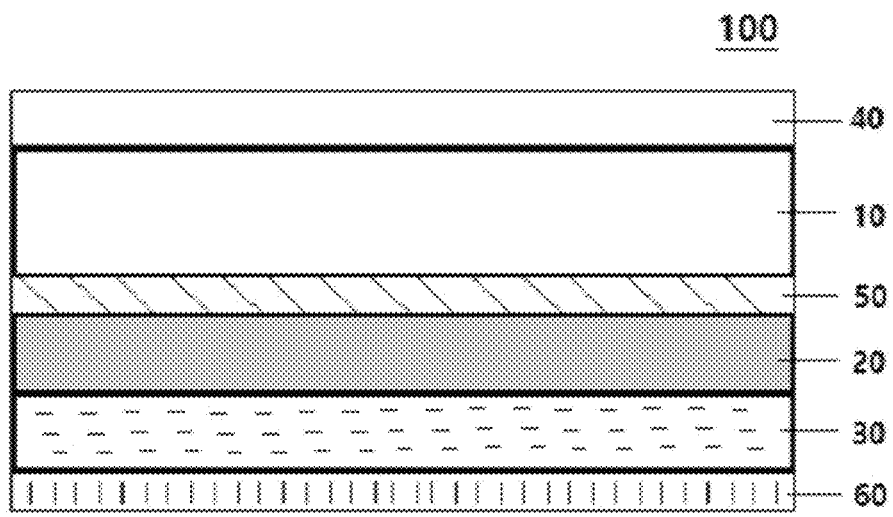
[FIG. 3]
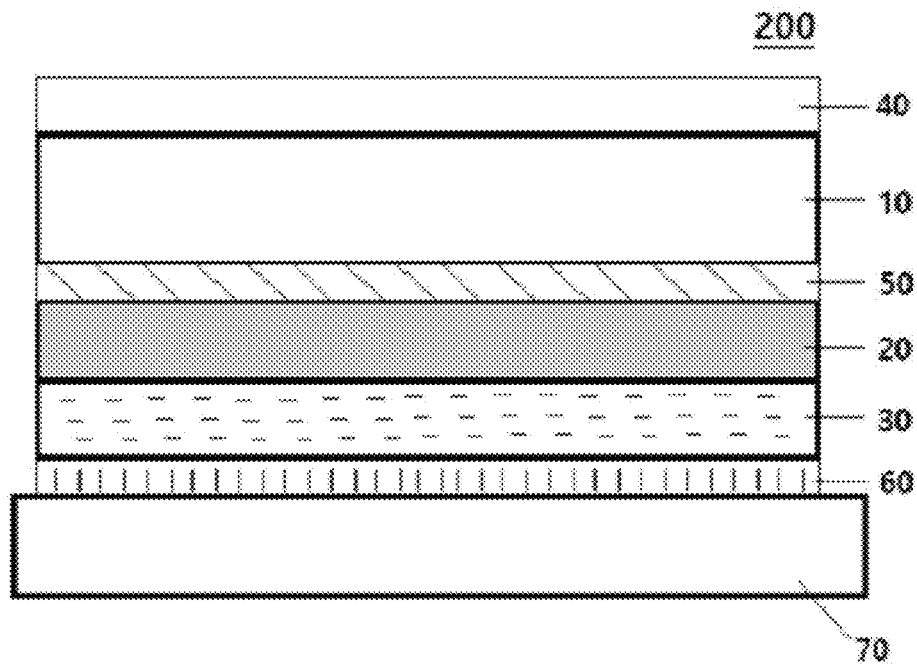

[FIG. 4]
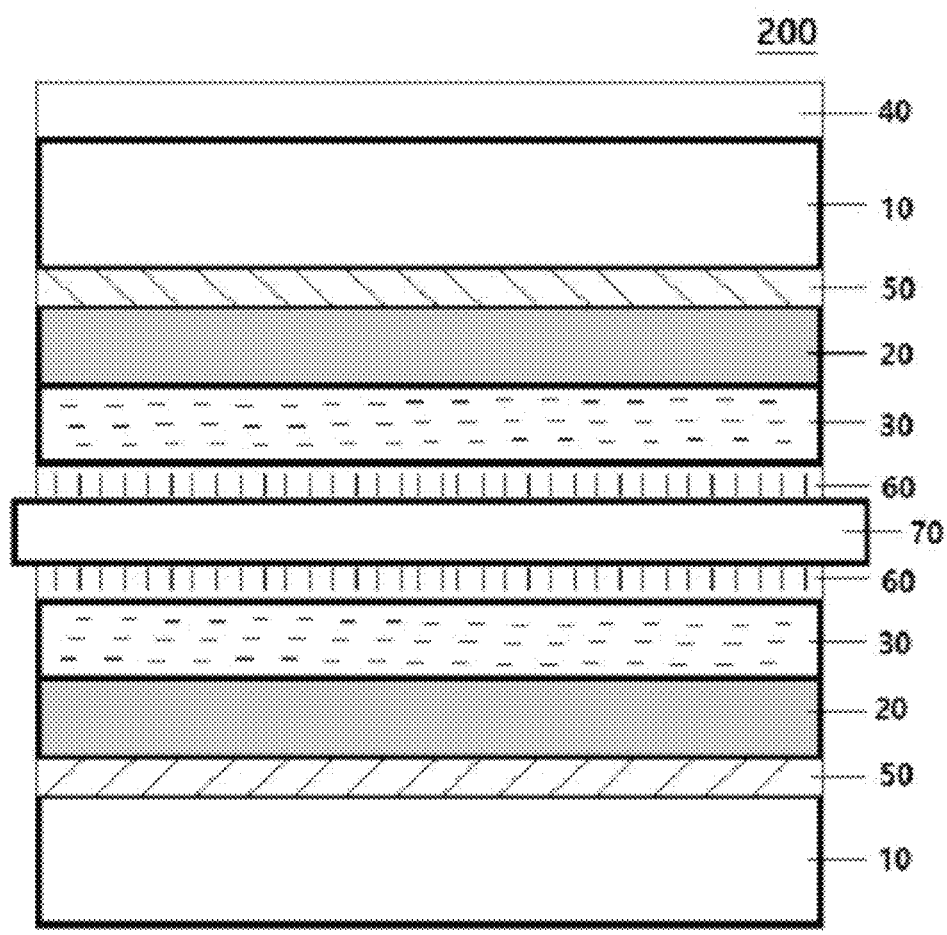

POLARIZING PLATE, LIQUID CRYSTAL PANEL AND DISPLAY DEVICE

CROSS-REFERENCE TO RELATED APPLICATION(S)

This application is a 35 U.S.C. 371 National Phase Entry Application from PCT/KR2019/013377 filed on Oct. 11, 2019, designating the United States, which claims priority to or the benefit of Korean Patent Application No. 10-2018-0124554 filed with the Korean Intellectual Property Office on Oct. 18, 2018, the entire contents of which are incorporated herein by reference.

FIELD OF THE INVENTION

The present disclosure relates to a polarizing plate, a liquid crystal panel, and a display device.

BACKGROUND OF THE INVENTION

A liquid crystal display device is a display visualizing polarization by a switching effect of a liquid crystal and has been used in various categories ranging from small and medium displays, such as a computer, a laptop, an electronic watch, and a mobile terminal device, to a large-scale TV.

Currently, as a considerable number of polarizing plates mass-produced and commercialized for display devices, those obtained by joining a protective film which is optically transparent and has a mechanical strength onto both surfaces or one surface of a polarizing film (polarizer) formed by coloring a dichromatic material such as iodine or a dichroic dye on a polyvinyl alcohol-based film, followed by cross-linking by a boron compound and stretching and aligning, have been used.

However, the stretched polyvinyl alcohol-based film has a problem in that shrinkage deformation easily occurs under a durability condition such as high temperature and high humidity. When the polarizer is deformed, the problems occur in that stress thereof affects the protective film and the liquid crystal and causes bending, and as a result, it leads to problems such as a change in physical properties of the polarizing plate including the polarizer and an occurrence of a light leakage phenomenon in a liquid crystal display device.

BRIEF SUMMARY OF THE INVENTION

The present disclosure provides a polarizing plate that has a stable internal structure together with high surface hardness and excellent scratch resistance, and also can control a heat shrinkage rate of detail layers and the like, realize a stable internal structure while having a good bending balance and thus preventing cracks, and further, prevent a light leakage phenomenon in a liquid crystal display device.

The present disclosure also provides a liquid crystal panel and a display device including the above polarizing plate.

In one aspect of the present disclosure, there is provided a polarizing plate including: a polarizer, and a first hard coating layer having a thickness of 10 um or less and a light-transmitting substrate which are positioned so as to face each other around the polarizer.

In another aspect of the present disclosure, there is provided a polarizing plate: including a polarizer, and a first hard coating layer having a thickness of 10 um or less and an anti-reflection film which are positioned so as to face each other around the polarizer, wherein the anti-reflection film includes a light-transmitting substrate and a second hard coating layer, and wherein a ratio (a/b) of the transmittance (a) at a wavelength of 400 nm of the second hard coating layer to the transmittance (b) at a wavelength of 500 nm of the second hard coating layer is 0.95 or less, or 0.85 to 0.95.

In still another aspect of the present disclosure, there is provided a polarizing plate including: a polarizer, and a first hard coating layer having a thickness of 10 um or less and a light-transmitting substrate which are positioned so as to face each other around the polarizer, wherein a ratio of heat shrinkage forces in two directions perpendicular to each other in the light-transmitting substrate is in a specific range.

In still another aspect of the present disclosure, there is provided a polarizing plate including: a polarizer, and a first hard coating layer having a thickness of 10 um or less and a light-transmitting substrate which are positioned so as to face each other around the polarizer, wherein a ratio of the heat shrinkage force in the second direction of the light-transmitting substrate to the heat shrinkage force in the first direction of the light-transmitting substrate perpendicular to the second direction in the temperature range of 60° C. to 100° C. is 0.6 to 1.5.

In still another aspect of the present disclosure, there is provided a liquid crystal panel wherein the polarizing plate is formed on at least one surface of the liquid crystal cell.

In the other aspect of the present disclosure, there is provided a display device including the above-mentioned polarizing plate.

DETAILED DESCRIPTION OF THE INVENTION

Hereinafter, the polarizing plate, the liquid crystal panel and the display device according to specific embodiments of the present disclosure will be described in more detail.

As used herein, terms such as first, second, and the like may be used to describe various components, and the terms are used only to discriminate one component from another component.

Also, the (meth)acryl is meant to include both acryl and methacryl.

Further, inorganic nanoparticles having a hollow structure refer to particles in a form in which an empty space exists on the surface of and/or inside the inorganic nanoparticles.

Further, the (co)polymer is meant to include both a co-polymer and a homo-polymer.

According to one embodiment of the present disclosure, there can be provided a polarizing plate including: a polarizer, and a first hard coating layer having a thickness of 10 um or less and an anti-reflection film which are positioned so as to face each other around the polarizer, wherein the anti-reflection film includes a light-transmitting substrate and a second hard coating layer, and wherein a ratio (a/b) of the transmittance (a) at a wavelength of 400 nm of the second hard coating layer to the transmittance (b) at a wavelength of 500 nm of the second hard coating layer is 0.95 or less, or 0.85 to 0.95.

Previously known polarizing plates have a structure in which a triacetyl cellulose (TAC) film, etc. are disposed on both sides around the polarizer, whereas the polarizing plate of one embodiment of the present disclosure has a structure in which an anti-reflection film including a light-transmitting substrate and a second hard coating layer having the above-described characteristics is disposed on one side, and a first hard coating layer having a thickness of 10 μm or less is disposed on the other side, and therefore, the heat shrinkage rate and heat shrinkage force between detail layers can be properly adjusted while realizing a thinner thickness, a robust internal structure can be achieved, moisture transmission toward the polarizer such as PVA film can be blocked, and the entire thickness of the polarizing plate can be reduced.

The polarizing plate of the embodiment includes a first hard coating layer having a thickness of 10 μm or less, and thus has a relatively low thickness, which can reduce the entire hardness. Thus, the anti-reflection film having a predetermined thickness may be provided on the opposite surface of the polarizer.

At this time, as the thickness of the anti-reflection film is increased, internal structure or interlayer bonding strength may be weakened. To prevent this, by including a second hard coating layer satisfying the condition that a ratio (a/b) of the transmittance (a) at a wavelength of 400 nm to the transmittance (b) at a wavelength of 500 nm of the second hard coating layer is 0.95 or less, or 0.85 to 0.95, it is possible to increase the light resistance stability against ultraviolet rays, and to further improve the long-term storage stability of the film.

More specifically, it was confirmed that as the second hard coating layer satisfying the condition that the ratio (a/b) of the transmittance (a) at a wavelength of 400 nm to the transmittance (b) at a wavelength of 500 nm of the second hard coating layer is 0.95 or less, or 0.85 to 0.95 is included, excellent effects are realized in the light-resistant adhesion test of the polarizing plate or the hardness test result according to the thickness.

Specifically, the second hard coating layer may have a transmittance of 98% to 100% at a wavelength of 500 nm and a transmittance of 85% to 95% at a wavelength of 400 nm while satisfying the condition that the a/b is 0.95 or less.

The properties of the second hard coating layer satisfying the condition that the ratio (a/b) of the transmittance (a) at a wavelength of 400 nm to the transmittance (b) at a wavelength of 500 nm of the second hard coating layer is 0.95 or less, or 0.85 to 0.95 may be determined by the composition of the binder resin of the second hard coating layer or other components contained therein, for example, the type or content of organic particles or inorganic particles and the like, and may vary depending on the type or content of the initiator or additives used in the production of the hard coating layer.

More specifically, as the second hard coating layer is formed from a composition including an initiator that absorbs 95% or more of light in the wavelength range of 380 nm to 400 nm, the second hard coating layer may satisfy the condition that a ratio (a/b) of the transmittance (a) at a wavelength of 400 nm to the transmittance (b) at a wavelength of 500 nm of the second hard coating layer is 0.95 or less, or 0.85 to 0.95.

The type of the "initiator that absorbs 95% or more of light in the wavelength range of 380 nm to 400 nm" is not particularly limited, but phosphate based compounds, benzophenone based compounds, etc. can be used. Examples of commercially available products of such initiators include IRG 819, IRG 369 or the like.

Meanwhile, the polarizing plate of the embodiment may include a light-transmitting substrate satisfying the condition that a ratio of the heat shrinkage force in the second direction of the light-transmitting substrate to the heat shrinkage force in the first direction of the light-transmitting substrate perpendicular to the second direction in the temperature range of 60° C. to 100° C. is 0.6 to 1.5, or 0.7 to 1.3, or 0.8 to 1.2, or 0.9 to 1.1.

Triacetyl cellulose (TAC) film, which is frequently used as a polarizer protective film of a polarizing plate, is weak in water resistance and thus can be warped in a high temperature/high humidity environment, and causes defects such as light leakage, whereas the present inventors have found through experiments that as the polarizing plate of the embodiment uses a light-transmitting substrate having the above-mentioned characteristics, it is possible to secure durability without significant change in physical properties or to form even if exposed for a long time during high temperature and high humidity conditions, thereby completing the present disclosure.

As the polarizing plate of the embodiment includes a light-transmitting substrate satisfying the condition in which a ratio of the heat shrinkage force in the second direction of the light-transmitting substrate perpendicular to the first direction to the heat shrinkage force in the first direction of the light-transmitting substrate in the temperature range of 60° C. to 100° C. is 0.6 to 1.5, or 0.7 to 1.3, or 0.8 to 1.2, or 0.9 to 1.1, it was confirmed that the polarizing plate can control a heat shrinkage rate between detail layers and the like even when a temperature of 60° C. or higher is applied during the manufacturing process and has a good bending balance and further that the polarizing plate can prevent cracks in the polarizing plate and prevent an occurrence of a light leakage phenomenon in the liquid crystal display.

More specifically, as the light-transmitting substrate satisfies the condition in which a ratio of the heat shrinkage force in the second direction of the light-transmitting substrate perpendicular to the first direction to the heat shrinkage force in the first direction of the light-transmitting substrate in the temperature range of 60° C. to 100° C. is 0.6 to 1.5, or 0.7 to 1.3, or 0.8 to 1.2, or 0.9 to 1.1, stress transmission under high temperature and high humidity is uniformly propagated and thus a deviation of the polarizing plate is improved, and an adhesive force between detail layers can be further improved to be robust.

In contrast, when the ratio of the heat shrinkage force in the second direction of the light-transmitting substrate perpendicular to the first direction to the heat shrinkage force in the first direction of the light-transmitting substrate in the temperature range of 60° C. to 100° C. is too small, stress transmission under high temperature and high humidity occurs non-uniformly, an adhesive force between detail layers decreases, cracks occur in the polarizing plate, and a light leakage phenomenon of the liquid crystal display device may appear.

Further, when the ratio of the heat shrinkage force in the second direction of the light-transmitting substrate perpendicular to the first direction to the heat shrinkage force in the first direction of the light-transmitting substrate in the temperature range of 60° C. to 100° C. is too high, stress transmission under high temperature and high humidity occurs non-uniformly, an adhesive force between detail layers decreases, cracks occur in the polarizing plate, and a light leakage phenomenon of the liquid crystal display device appears, which may be technically disadvantageous.

Meanwhile, as described above, in the light-transmitting substrate, the ratio of the heat shrinkage force in the second direction of the light-transmitting substrate perpendicular to the first direction to the heat shrinkage force in the first direction of the light-transmitting substrate in the temperature range of 60° C. to 100° C. may be 0.6 to 1.5. Depending on factors such as the thickness of the light-transmitting substrate and modulus in each direction, the ratio of the heat shrinkage rate in the second direction of the light-transmitting substrate perpendicular to the first direction to the heat shrinkage rate in the first direction of the light-transmitting substrate in the temperature range of 60° C. to 100° C. may be 0.4 to 4, or 0.8 to 2.

As the ratio of the heat shrinkage rate in the second direction of the light-transmitting substrate perpendicular to the first direction to the heat shrinkage rate in the first direction of the light-transmitting substrate in the temperature range of 60° C. to 100° C. is 0.4 to 4, or 0.8 to 2, in the polarizing plate including the light-transmitting substrate, even when a temperature of 60° C. or higher is applied in the manufacturing process, variations in the heat shrinkage rate between detail layers is not so large, and thus a bending balance of the polarizing plate is improved, cracks of the polarizing plate and a light leakage phenomenon of the liquid crystal display device can be prevented.

When the ratio of the heat shrinkage rate in the second direction of the light-transmitting substrate perpendicular to the first direction to the heat shrinkage rate in the first direction of the light-transmitting substrate in the temperature range of 60° C. to 100° C. is too small, stress transmission under high temperature and high humidity occurs non-uniformly, an adhesive force between detail layers decreases, cracks occur in the polarizing plate, and a light leakage phenomenon of the liquid crystal display device may appear.

Further, when the ratio of the heat shrinkage rate in the second direction of the light-transmitting substrate perpendicular to the first direction to the heat shrinkage rate in the first direction of the light-transmitting substrate in the temperature range of 60° C. to 100° C. is too high, for example, when the ratio is greater than 4, stress transmission under high temperature and high humidity occurs non-uniformly, an adhesive force between detail layers decreases, cracks occur in the polarizing plate, and a light leakage phenomenon of the liquid crystal display device appears, which may be technically disadvantageous.

The heat shrinkage force in the first direction and the heat shrinkage force in the second direction of the light-transmitting substrate may be respectively measured by exposing it to a temperature of 60° C. to 100° C. for 10 to 300 minutes.

The heat shrinkage rate in the first direction and the heat shrinkage rate in the second direction of the light-transmitting substrate may be respectively measured by exposing it to a temperature of 60° C. to 100° C. for 10 to 100 minutes.

The first direction of the light-transmitting substrate is an MD direction (machine direction) of the light-transmitting substrate, and the second direction of the light-transmitting substrate may be a TD direction (transverse direction) of the light-transmitting substrate.

The light-transmitting substrate may have a transmittance of 50% or more at a wavelength of 300 nm or more.

In addition, the polarizing plate of the embodiment includes a light-transmitting substrate that satisfies the conditions related to the ratio of the heat shrinkage force or the heat shrinkage rate between the first direction and the second direction of the light-transmitting substrate in the temperature range of 60° C. to 100° C., and simultaneously includes a first hard coating layer having a thickness of 10 um or less on the opposite surface to the light-transmitting substrate of the polarizing plate, and therefore, the heat shrinkage rate and heat shrinkage force between detail layers can be properly adjusted while achieving a thinner thickness, and a robust internal structure can be realized.

As described above, it may include an anti-reflection film formed on one surface of the light-transmitting substrate so as to oppose to the polarizer.

An example of the polarizing plate 100 of the embodiment is shown in FIG. 1. The polarizing plate shown in FIG. 1 includes a polarizer 20 and a first hard coating layer 30 having a thickness of 10 um or less and an anti-reflection film which are positioned so as to face each other around the polarizer, wherein the anti-reflection film includes a light-transmitting substrate 10 and an second hard coating layer 40 formed on one surface of the light-transmitting substrate.

The light-transmitting substrate may have a thickness direction retardation (Rth) measured at a wavelength of 400 nm to 800 nm of 3,000 nm or more.

By controlling the retardation of the light-transmitting substrate to 3,000 nm or more, 4,000 to 15,000 nm, or 5,000 to 10,000 nm, the rainbow phenomenon due to a destructive interference is suppressed, and the visibility of an image display device can be improved similar to the cellulose ester-based film.

The thickness direction retardation (Rth) is calculated by substituting into the following Equation 1 a refractive index in the slow axis direction ($n_x$) which is the direction with the highest refractive index in the plane of the light-transmitting substrate, a refractive index in the fast axis direction ($n_y$) which is a direction orthogonal to the slow axis direction, and a thickness d (unit: nm) of the light-transmitting substrate.

$$Rth=((n_x+n_y)/2-n_z)\times d \qquad \text{[Equation 1]}$$

The in-plane retardation (Re) is calculated by substituting into the following Equation 2 the refractive index in the slow axis direction ($n_x$), the refractive index in the fast axis direction ($n_y$) and the thickness d (unit: nm) of the light transmitting substrate.

$$Re=(n_x-n_y)\times d \qquad \text{[Equation 2]}$$

In addition, such retardation may be, for example, a value measured with the use of an automatic double refraction meter (KOBRA-WR, measurement angle: 0°, measurement wavelength: 548.2 nm). Alternatively, the retardation can also be measured by the following method. First, the alignment axis direction of the light-transmitting substrate is determined using two polarizing plates, and refractive indices nx and ny of two axes orthogonal to the alignment direction are determined by an Abbe refractometer NAR-4T. In this case, an axis showing a larger refractive index is defined as a slow axis. In addition, the thickness of the light-transmitting substrate is measured using, for example, an electric micrometer, and the refractive index difference $n_x-n_y$ (hereinafter, $n_x-n_y$ is referred to as $\Delta n$) is calculated using the refractive index obtained above. The retardation can also be calculated from the product of the refractive index difference $\Delta n$ and the thickness d(nm) of a light-transmitting substrate.

Since the retardation of the light-transmitting substrate is 3000 nm or more, the refractive index difference $\Delta n$ may be 0.05 or more, 0.05 to 0.20, or 0.08 to 0.13. When the refractive index difference $\Delta n$ is less than 0.05, the thickness of the light-transmitting substrate necessary for obtaining the retardation value described above may be increased. Meanwhile, when the refractive index difference $\Delta n$ exceeds 0.20, the necessity of excessively increasing the stretch ratio occurs and thus, the light-transmitting substrate is likely to be torn and broken, and the practicality as an industrial material may be remarkably lowered, and the resistance to moisture and heat may be lowered.

The refractive index ($n_x$) in the slow axis direction of the light-transmitting substrate may be 1.60 to 1.80 or 1.65 to 1.75. Meanwhile, the refractive index ($n_y$) in the fast axis direction of the light-transmitting substrate having the above-mentioned in-plane birefringence may be 1.50 to 1.70, or 1.55 to 1.65.

Meanwhile, as the light-transmitting substrate, a polyethylene terephthalate (PET) film having excellent water resistance, having almost no possibility of inducing a light leakage phenomenon and having excellent mechanical properties can be used.

Meanwhile, the light-transmitting substrate may have low moisture permeation characteristics while having the thickness direction retardation (Rth) measured at a wavelength 400 nm to 800 nm of 3,000 nm or more. More specifically, the light-transmitting substrate may have a moisture permeation amount of 100 g/m$^2$ or less, or 10 to 100 g/m$^2$ when the moisture permeation amount is measured for 24 hours under the conditions of 40° C. and 100% humidity.

Meanwhile, the thickness of the light-transmitting substrate is not particularly limited, but may be 10 to 150 μm, 20 to 120 μm, or 30 to 100 μm. When the thickness of the light-transmitting substrate is less than 10 μm, it is excessively thinner than the thickness of the first hard coating layer and so a bending occurs, the flexibility of the light-transmitting substrate decreases and it may be difficult to control the process. In addition, when the light-transmitting substrate is excessively thick, the transmittance of the light-transmitting substrate is decreased, the optical properties may be reduced, and it is difficult to reduce the thickness of the image display device including the same.

In order to prevent the phenomenon in which the internal structure of the polarizing plate is more robust and a bending occurs even when exposed to high-temperature conditions, the ratio of the thickness of the first hard coating layer to the thickness of the light-transmitting substrate may be 0.02 to 0.25.

As described above, if the thickness of the light-transmitting substrate does not have an appropriate range compared to the thickness of the first hard coating layer, the polarizing plate can be bent, the flexibility of the light-transmitting substrate is reduced and it may be difficult to control the process.

On the other hand, the polarizing plate of the embodiment includes a light-transmitting substrate satisfying the conditions in which the ratio of the heat shrinkage force in the second direction of the light-transmitting substrate perpendicular to the first direction to the heat shrinkage force in the first direction of the light-transmitting substrate in the temperature range of 60° C. to 100° C. is 0.6 to 1.5, or 0.7 to 1.3, or 0.8 to 1.2, or 0.9 to 1.1, and simultaneously includes a first hard coating layer having a thickness of 10 um or less, and therefore, a more robust structure can be realized even by a thinner thickness compared to other polarizer structures previously known in the art, and it may have a characteristic that the durability or physical properties do not significantly change due to external heat.

In addition, as described above, the ratio of the heat shrinkage rate in the second direction of the light-transmitting substrate perpendicular to the first direction to the heat shrinkage rate in the first direction of the light-transmitting substrate in the temperature range of 60° C. to 100° C. may be 0.4 to 4, or 0.8 to 2.

More specifically, the thickness of the polarizer plus the first hard coating layer plus the light-transmitting substrate may be 200 μm or less. For example, the polarizer may have a thickness of 40 μm or less, or 1 to 40 μm, the first hard coating layer may have a thickness of 10 μm or less, or 1 to 10 μm, and the light-transmitting substrate may have a thickness of 150 μm or less.

Meanwhile, a specific composition of the first hard coating layer is not particularly limited, but for example, the first hard coating layer may include a binder resin; and organic fine particles having a particle size of 0.5 μm to 10 μm, or inorganic fine particles having a particle size of 1 nm to 500 nm dispersed in the binder resin.

The binder resin contained in the first hard coating layer may include a photocurable resin. The photocurable resin refers to a polymer of a photopolymerizable compound which can cause a polymerization reaction when irradiated with light such as ultraviolet light.

Examples of the photocurable resin may include: a polymer or a copolymer formed from the group consisting of a reactive acrylate oligomer group including a urethane acrylate oligomer, an epoxide acrylate oligomer, a polyester acrylate, and a polyether acrylate; and a polyfunctional acrylate monomer group including dipentaerythritol hexaacrylate, di pentaerythritol pentaacrylate, pentaerythritol tetraacrylate, pentaerythritol triacrylate, trimethylolpropane triacrylate, glycerol propoxylate triacrylate, trimethylolpropane ethoxylate triacrylate, trimethylpropyl triacrylate, 1,6-hexanediol diacrylate, tripropylene glycol diacrylate, and ethylene glycol diacrylate, or an epoxy resin containing an epoxy group including an epoxy group, an alicyclic epoxy group, a glycidyl group epoxy group, or an oxetane group, etc.

The binder resin may further include a (co)polymer (hereinafter referred to as a high molecular weight (co) polymer) having a weight average molecular weight of 10,000 g/mol or more, or 10,000 g/mol to 500,000 g/mol together with the above-described photocurable resin. The high molecular weight (co)polymer may include, for example, one or more polymers selected from the group consisting of cellulose-based polymers, acrylic-based polymers, styrene-based polymers, epoxide-based polymers, nylon-based polymers, urethane-based polymers and polyolefin-based polymers.

The organic or inorganic fine particles are not particularly limited in terms of particle sizes, but for example, the organic fine particles may have a particle size of 1 to 10 μm, and the inorganic particles may have a particle size of 1 nm to 500 nm, or 1 nm to 300 nm.

In addition, specific examples of the organic or inorganic fine particles included in the first hard coating layer are not limited, but for example, the organic or inorganic fine particles may be organic fine particles including acrylic-based resin, styrene-based resin, epoxide resin and nylon resin or inorganic fine particles including silicon oxide, titanium dioxide, indium oxide, tin oxide, zirconium oxide and zinc oxide.

Meanwhile, the anti-reflection film may have an average reflectance of 2% or less in a wavelength range of 380 nm to 780 nm.

The anti-reflection film may include a light-transmitting substrate and a second hard coating layer, and may further include a low refractive index layer formed on one surface of the second hard coating layer so as to oppose to the light transmitting substrate.

The low refractive index layer may have a refractive index of 1.20 to 1.60 in a wavelength region of 380 nm to 780 nm.

Specific examples of the second hard coating layer included in the anti-reflection film is not limited, but the second hard coating layer included in the anti-reflection film may include a binder resin; and organic fine particles having a particle size of 0.5 μm to 10 μm, or inorganic fine particles having a particle size of 1 nm to 500 nm dispersed in the binder resin, similar to "the first hard coating layer having a thickness of 10 um or less positioned so as to face around the polarizer".

The detailed description of the binder resin and the organic fine particles having a particle size of 0.5 μm to 10 μm or the inorganic fine particles having a particle size of 1 nm to 500 nm contained in the second hard coating layer included in the anti-reflection film includes the contents described above.

The second hard coating layer may have a thickness of 1 μm to 30 μm, or 2 μm to 20 μm, and it is preferable to have a thickness of 3 μm to 10 μm or 4 μm to 8 μm in consideration of the hardness of the second hard coating layer or the rolling property of the film. If the thickness of the second hard coating layer is too low, the hardness of the film is lowered, which does not perform a role of surface protection. If the thickness is too high, the warpage of the film occurs, and the bending balance of the polarizing plate structure including the first hard coating layer is broken, so that warpage may increase or cracks may be generated when evaluating the durability.

The low reflective index layer having a refractive index of 1.20 to 1.60 in the wavelength region of 380 nm to 780 nm may include a binder resin and organic fine particles or organic fine particles dispersed in the binder resin, and optionally, it may further include a fluorine-containing compound having a photoreactive functional group and/or a silicon-based compound having a photoreactive functional group.

The binder resin includes a (co)polymer containing a polyfunctional (meth)acrylate-based repeating unit, wherein the repeating unit may be derived from polyfunctional (meth)acrylate-based compounds, such as trimethylolpropane triacrylate (TMPTA), trimethylolpropane ethoxy triacrylate (TMPEOTA), glycerin propoxylate triacrylate (GPTA), pentaerythritol tetraacrylate (PETA), or pentaerythritol hexaacrylate (DPHA).

The photoreactive functional group contained in the fluorine-containing compound or silicon-based compound may be at least one functional group selected from the group consisting of a (meth)acrylate group, an epoxide group, a vinyl group, and a thiol group.

The fluorine-containing compound containing a photoreactive functional group may be at least one compound selected from the group consisting of i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer in which at least one photoreactive functional group is substituted and at least one fluorine is substituted on at least one silicon; and iv) a polyether compound in which at least one photoreactive functional group is substituted and at least one hydrogen is substituted with fluorine.

The low reflective index layer may also include hollow inorganic nanoparticles, solid inorganic nanoparticles, and/or porous inorganic nanoparticles.

The hollow inorganic nanoparticles refer to particles having a maximum diameter of less than 200 nm, and a shape in which empty space is present on the surface and/or inside thereof. The hollow inorganic nanoparticles may include at least one selected from the group consisting of inorganic fine particles having a number average particle size of 1 to 200 nm, or 10 to 100 nm. In addition, the hollow inorganic nanoparticles may have a density of 1.50 g/cm$^3$ to 3.50 g/cm$^3$.

The hollow inorganic nanoparticles may contain at least one reactive functional group selected from the group consisting of a (meth)acrylate group, an epoxide group, a vinyl group, and a thiol group on a surface thereof. As the above-mentioned reactive functional group contains on the surface of the hollow inorganic nanoparticles, it is possible to have a higher degree of crosslinking.

The solid inorganic nanoparticles may include at least one selected from the group consisting of solid inorganic fine particles having a number average particle size of 0.5 to 100 nm.

The porous inorganic nanoparticles may include at least one selected from the group consisting of inorganic fine particles having a number average particle size of 0.5 to 100 nm.

The low reflective index layer may include 10 to 400 parts by weight of the inorganic nanoparticles; and 20 to 300 parts by weight of a fluorine-containing compound and/or a silicon-based compound including the photoreactive functional group, based on 100 parts by weight of the (co) polymer.

The polarizing plate of the embodiment includes a polarizer.

As the polarizer, a polarizer well-known in the art, for example, a film composed of polyvinyl alcohol (PVA) containing iodine or dichroic dye can be used. At this time, the polarizer may be produced by dyeing iodine or a dichroic dye on a polyvinyl alcohol film and stretching it, but the production method thereof is not particularly limited.

Meanwhile, when the polarizer is a polyvinyl alcohol film, the polyvinyl alcohol film may be used without particular limitation as long as it includes a polyvinyl alcohol resin or a derivative thereof. At this time, examples of the derivative of the polyvinyl alcohol resin include, but not limited to, polyvinyl formal resin, polyvinyl acetal resin, and the like. Alternatively, the polyvinyl alcohol film may be a commercially available polyvinyl alcohol film generally used in the manufacture of polarizers in the art, and examples thereof include P30, PE30 or PE60 (available from Kuraray Co., Ltd.), and M3000 or M6000 (available from Nippon Synthetic Chemical Industry Co., Ltd.).

Meanwhile, the polyvinyl alcohol film may have a degree of polymerization of 1000 to 10000 or 1500 to 5000, but is not limited thereto. When the degree of polymerization satisfies the above range, molecules may freely move and may be smoothly mixed with iodine or a dichroic dye, etc. In addition, the polarizer may have a thickness of 40 μm or less, 30 μm or less, 20 μm or less, 1 to 20 μm, or 1 to 10 μm. In this case, a device such as a polarizing plate or an image display device including the polarizer can be made thinner and lighter.

The polarizing plate may further include an adhesive layer disposed between the polarizer and the light-transmitting substrate and having a thickness of 0.1 μm to 5 μm.

In the adhesive layer, various adhesives for polarizing plates used in the art, for example, polyvinyl alcohol-based adhesives, polyurethane-based adhesives, acrylic-based adhesives, cationic or radical-based adhesives may be used as the adhesive without limitation.

Meanwhile, the polarizing plate may further include a cohesive layer formed on the other surface of the first hard coating layer coming into contact with the polarizer.

The cohesive layer may enable attachment of the polarizing plate of the embodiment and the image panel of the image display device. The cohesive layer may be formed using various adhesives well known in the art, and the kind thereof is not particularly limited. For example, the cohesive layer may be formed using a rubber-based adhesive, an acrylic-based adhesive, a silicone-based adhesive, a urethane-based adhesive, a polyvinyl alcohol-based adhesive, a polyvinylpyrrolidone-based adhesive, a polyacrylamide-based adhesive, a cellulose-based adhesive, a vinyl alkyl ether-based adhesive or the like.

Another example of the polarizing plate 100 of the embodiment is shown in FIG. 2. The polarizing plate 100 shown in FIG. 2 includes a polarizer 20 and a first hard coating layer 30 having a thickness of 10 μm or less and a light-transmitting substrate 10 which are positioned so as to face each other around the polarizer, wherein the polarizing plate includes an anti-reflection film including the light-transmitting substrate 10 and the second hard coating layer 40 formed on one surface thereof, and wherein the polarizing plate includes an adhesive layer 50 positioned between the polarizer and the light-transmitting substrate and a cohesive layer 60 formed on the other surface of the hard coating film coming into contact with the polarizer.

The thickness of the cohesive layer is also not particularly limited, and for example, the cohesive layer may have a thickness of 1 to 50 um.

According to another embodiment of the present disclosure, a liquid crystal panel in which a polarizing plate is formed on at least one surface of a liquid crystal cell can be provided.

An example of the liquid crystal panel 200 of the embodiment is shown in FIG. 3. The liquid crystal panel 200 shown in FIG. 3 has a structure in which the polarizing plate 100 is formed on one surface of the liquid crystal panel.

In addition, still another example of the liquid crystal panel 200 of the embodiment is shown in FIG. 4. The liquid crystal panel 200 shown in FIG. 4 has a structure in which the polarizing plate 100 is formed on both surfaces of the liquid crystal panel.

In the liquid crystal panel, the polarizing plates may be respectively formed on both surfaces of the liquid crystal cell, wherein the two polarizing plates may be positioned such that the MD direction of the polarizer of the polarizing plate formed on one surface of the liquid crystal cell and the MD direction of the polarizer of the polarizing plate formed on the other surface are perpendicular to each other.

According to still another embodiment of the present disclosure, a display device including the polarizing plate described above can be provided.

Specific examples of the display device are not limited, and for example, it may be a device such as a liquid crystal display, a plasma display, or an organic light emitting diode.

As one example, the display device may be a liquid crystal display device including a pair of polarizing plates opposing to each other; a thin film transistor, a color filter, and a liquid crystal cell which are sequentially stacked between the pair of polarizing plates; and a backlight unit.

In the display device, the anti-reflection film may be provided on the outermost surface of a display panel at an observer side or a backlight side.

In the display device including the anti-reflection film, the anti-reflection film may be positioned on one surface of the polarizing plate that is relatively far from the backlight unit among the pair of polarizing plates.

In still another example, the display device may include a display panel; and the polarizing plate positioned on at least one surface of the display panel.

The display device may be a liquid crystal display device including a liquid crystal panel and an optical laminate provided on both surfaces of the liquid crystal panel, wherein at least one of the polarizing plates may be a polarizing plate including a polarizer according to one embodiment of the present disclosure described above. In this case, the kind of the liquid crystal panel included in the liquid crystal display device is not particularly limited, but for example, a known panel such as a passive matrix-type panel such as a twisted nematic (TN), super twisted nematic (STN), ferroelectric (F) or polymer dispersed (PD) panel; an active matrix-type panel such as a two or three terminal panel, an in-plane switching (IPS) panel or a vertical alignment (VA) panel may be applied as the liquid crystal panel.

ADVANTAGEOUS EFFECTS

According to the present disclosure, there can be provided a polarizing plate which not only has a stable internal structure together with high surface hardness and excellent scratch resistance, but also can control a heat shrinkage rate of detailed constituent layers, realize a stable internal structure while having a good bending balance and thus prevent cracks, and further, prevent a light leakage phenomenon in a liquid crystal display device, a liquid crystal panel and a display device including the above-mentioned polarizing plate.

BRIEF DESCRIPTION OF THE DRAWINGS

FIG. 1 shows an example of a polarizing plate of an embodiment of the present disclosure.

FIG. 2 shows another example of a polarizing plate of an embodiment of the present disclosure.

FIG. 3 shows an example of a liquid crystal panel of an embodiment of the present disclosure.

FIG. 4 shows another example of a liquid crystal panel of an embodiment of the present disclosure.

DETAILED DESCRIPTION OF THE EMBODIMENTS

Hereinafter, embodiments of the present disclosure are described in further detail with reference to examples. However, these examples are for illustrative purposes only and are not intended to limit the scope of the present disclosure.

PREPARATION EXAMPLE

Preparation Example 1: Preparation of Anti-Reflection Film (1) Preparation of Coating Liquid for Forming a Hard Coating Layer (Second Hard Coating Layer) of an Anti-Reflection Film The components shown in Table 1 were mixed to prepare a coating liquid (B1, B2, B3, B4, B5) for forming a hard coating layer of the anti-reflection film.

TABLE 1

| (Unit: g) | B1 | B2 | B3 | B4 | B5 |
|---|---|---|---|---|---|
| DPHA | 12.5 | 12.5 | 12.5 | 12.5 | 12.5 |
| UA-306T | 12.5 | 12.5 | 12.5 | 12.5 | 12.5 |
| I184 | — | — | — | 0.4 | 0.2 |

TABLE 1-continued

| (Unit: g) | B1 | B2 | B3 | B4 | B5 |
|---|---|---|---|---|---|
| D1173 | — | — | — | 0.4 | 0.2 |
| IRG 819 | 0.8 | — | 0.4 | — | — |
| IRG 369 | — | 0.8 | 0.4 | — | — |
| 2-BuOH | 40 | 40 | 40 | 40 | 40 |
| MIBK | 20 | 20 | 20 | 20 | 20 |
| PGMEA | 10 | 10 | 10 | 10 | 10 |
| XX-113BQ(2.0 μm 1.555) | 1.5 | 1.5 | 1.5 | 1.5 | 1.5 |
| MA-ST(30% in MeOH) | 0.5 | 0.5 | 0.5 | 0.5 | 0.5 |

DPHA: dipentaerythritol hexaacrylate

PETA: pentaerythritol triacrylate

UA-306T: urethane acrylate series, reaction product with toluene diisocyanate and pentaerythritol triacrylate (manufactured by Kyoeisha Chemical)

IRG-819: initiator (Irgacure 819, Ciba Specialty Chemicals)

IRG-369: initiator (Irgacure 369, Ciba Specialty Chemicals)

D-1173: initiator (Darocur 1173, Ciba Specialty Chemicals)

2-BuOH: 2-butylalcohol

MIBK: methyl isobutyl ketone

PGMEA: propylene glycol monomethyl ether acetate

XX-113BQ (2.0 μm, reflective index: 1.515): copolymerized particles of polystyrene and polymethyl methacrylate (manufactured by Sekisui Plastic)

MA-ST (30% in MeOH): Dispersion in which silica nanoparticles with a size of 10~15 nm are dispersed in methyl alcohol (manufacture by Nissan Chemical)

(2) Preparation of Coating Liquid (C) for Forming Low Reflective Index Layer 100 g of trimethylolpropane triacrylate (TMPTA), 283 g of hollow silica nanoparticles (diameter range: about 42 nm to 66 nm, JSC Catalyst and Chemicals), 59 g of solid silica nanoparticles (diameter range: about 12 nm to 19 nm), 115 g of a first fluorine-containing compound (X-71-1203M, Shin-Etsu), 15.5 g of a second fluorine-containing compound (RS-537, DIC Corporation) and 10 g of an initiator (Irgacure 127, Ciba) were diluted in a MIBK (methyl isobutyl ketone) solvent so as to have a solid content of 3% by weight, thereby preparing a coating liquid for forming a low reflective index layer.

(3) Preparation of Anti-reflection Film Formed on Light-Transmitting Substrate

Each of the prepared coating liquids for forming a hard coating layer (B1, B2, B3, B4, B5) was coated onto the respective polyethylene terephthalate (PET) films shown in Tables 2 and 3 below using a #12 Mayer bar, and then dried at the temperature shown in Tables 2 and 3 below for 2 minutes, and UV-cured to form a hard coating layer (coating thickness of 5 μm). The H bulb was used as a UV lamp and a curing reaction was performed under nitrogen atmosphere. The amount of UV light irradiated upon curing was 100 mJ/cm$^2$.

At this time, the ratio(a/b) of the transmittance (a) at the wavelength of 400 nm of the second hard coating layer to the transmittance (b) at the wavelength of 500 nm of the second hard coating layer formed on the substrate was obtained by measuring the transmittance of the hard coating film in the range of 780 to 350 nm using a UV spectrophotometer (Solidspec-3700, Shimadzu). The results are shown in Tables 2 and 3 below The coating liquid (C) for forming the low reflective index layer was coated onto the hard coating film using a #4 Mayer bar so that the thickness was about 110 to 120 nm, and then dried and cured for 1 minute at the temperature shown in Tables 2 and 3 below. During the curing, the dried coating was irradiated with ultraviolet light of 252 mJ/cm$^2$ under a nitrogen purge.

Preparation Example 2: Preparation of Coating Liquid for Forming First Hard Coating Layer and Preparation of Polarizer with First Hard Coating Layer Having Thickness of 10 um or less Formed Thereon (1) Preparation of Coating Liquid (A) for Forming First Hard Coating Layer 28 g of trimethylolpropane triacrylate, 2 g of KBE-403, 0.1 g of initiator KIP-100f, and 0.06 g of leveling agent (Tego wet 270) were uniformly mixed to prepare a hard coating composition.

(2) Preparation of Polarizer with First Hard Coating Layer Formed Thereon

Polyvinyl alcohol polarizer (thickness: 25 um, manufacturer: LG Chem) was bonded onto the light-transmitting substrate of the anti-reflection film prepared in Preparation Example 1 using a UV adhesive, then the coating liquid (A) for forming the hard coating layer was coated onto the opposite side of the light-transmitting substrate to a thickness of 7 um, and the dried coating was irradiated with ultraviolet light of 500 mJ/cm$^2$ under nitrogen purge to form a first hard coating layer.

EXAMPLES AND COMPARATIVE EXAMPLES

Preparation of Polarizing Plate and Liquid Crystal Panel (1) Preparation of Polarizing Plate The anti-reflection film formed on the light-transmitting substrate obtained in Preparation Example 1 and the polarizer were joined using a UV-curable adhesive, and then a first hard coating layer prepared in Preparation Example 2 was formed on the other side of the polarizer to prepare the polarizing plate of each of Examples and Comparative Examples described in Table 2 and Table 3 below. At this time, the polarizing plate was manufactured such that the absorption axis of a polarizer and the TD direction of a light-transmitting substrate were parallel.

1) Measurement of the Ratio of Heat Shrinkage Force

In this case, the ratio of heat shrinkage force in the MD direction of the polyethylene terephthalate (PET) film used in each of Examples and Comparative Examples: the heat shrinkage force in the TD direction was measured using a DMA instrument (dynamic mechanical analyzer) (TA Instruments).

The temperature was set to increase by 25° C. per minute from 25° C. and then reach 75° C. after 3 minutes, and then the temperature was set to reach 80° C. after 7 minutes. The measurement time was 2 hours. The values of the heat shrinkage force in the MD direction and the heat shrinkage force in the TD direction of the PET film after 2 hours were measured 2 hours after stabilization at 80° C.

The heat shrinkage force in the MD direction and the heat shrinkage force in the TD direction of the PET film were respectively determined by fastening a sample cut into a width of 6 mm and a length of 50 mm to a clamp and then pulling and fixing the sample so as to maintain 0.1% of strain in the 0.01 N preload state, and then measuring the shrinkage force required to maintain 0.1% of strain at a high temperature. The heat shrinkage force in the MD direction and the heat shrinkage force in the TD direction of the PET film were respectively measured and their ratios were determined.

PET1: shrinkage force ratio (MD:TD) is about 1
PET2: shrinkage force ratio (MD:TD) is about 2
PET3: shrinkage force ratio (MD:TD) is about 0.5

2) Measurement of the Ratio of Heat Shrinkage Rate

The ratio of a heat shrinkage rate in the MD direction: a heat shrinkage rate in the TD direction of the polyethylene terephthalate (PET) film used in each of Examples and Comparative Examples was calculated by cutting each PET film into a size of 30 cm*30 cm (width*length), allowing to stand at 80° C. for 30 minutes and then determining the shrinkage rate (modified length/initial length) in each of the MD and TD directions.

PET 1: The ratio of heat shrinkage rate (MD:TD) is about 0.9~1.1
PET 2: The ratio of heat shrinkage rate (MD:TD) is about 10~12
PET 3: The ratio of heat shrinkage rate (MD:TD) is about 4.5~6

(2) Preparation of Sample for Thermal Shock Evaluation

The polarizing plate cut into a square where the length of one side was 10 cm was bonded to one surface of the glass for TV (12 cm wide, 12 cm long, and 0.7 mm thick) to prepare a sample for thermal shock evaluation. At this time, the polarizing plate was cut so that the MD direction of the polarizer was parallel to one side of the square.

EXPERIMENTAL EXAMPLE

Experimental Example 1: Light-Resistant Adhesion Test and Hardness Measurement of Anti-Reflection Film (1) Light-Resistant Adhesion Test of Anti-Reflection Film The polarizing plate cut into a square having a length 10 cm of one side was exposed to a UVB (280-360 nm) light resistance exposure apparatus (UV tester, Coretech Korea Co., Ltd.) for 24 hours. The film was arranged so that the coating surface was directed toward a UV light source, and the distance between the UV light source and the coating film was 15 to 30 cm.

After 24 hours, scratches were made so as to form 100 grids within a size of 1 cm*1 cm to 2 cm*2 cm using a cutter knife and attached using a Nichiban Tape, and then a peel test was performed. The peel test was performed twice on the same surface, and the adhesive strength was evaluated from the 5B (no peel) level to 0B (fully peeled) according to the peeled level.

Evaluation Criteria 5B (not peeled)
4B (1-5 grids containing the peeled portion)
3B (6-15 grids containing the peeled portion)
2B (16-35 grids containing the peeled portion)
1B (36-50 grids containing the peeled portion)
0B (51 or more grids containing the peeled portion)

(2) Hardness Measurement of Anti-reflection Film

The polarizing plate without the adhesive layer or the polarizing plate from which the adhesive layer was removed was cut into a size of 5 cm*5 cm. The film was fixed to a sample table of the pencil hardness tester (Chungbuk Tech) so that it could be measured in the direction perpendicular to the MD direction of the film, then the film was fixed at an angle of 45 degrees, and then the pencil hardness was measured at a speed of 300 mm/min under a load of 500 g.

One measurement length was 45 mm and measurement was performed five times in total. In the state where the press of 5 mm at the initial stage of the measurement, pressing and scratching of the remaining portion were evaluated with the naked eye, and it was determined as OK if there were no scratches four or more times.

Experimental Example 2: Thermal Shock Evaluation

For the prepared polarizing plate and a sample for evaluation to which the polarizing plate was joined, the thermal shock test was conducted under the following conditions and the following three items were measured and confirmed.

Preparation of Samples for Thermal Shock Evaluation

The polarizing plate cut into a square having a length 10 cm of one side was bonded to one surface of a glass for TV (12 cm wide, 12 cm long, and 0.7 mm thick) to prepare a sample for thermal shock evaluation. At this time, the polarizing plate was cut so that the MD direction of a polarizer was parallel to one side of the square.

Measuring Conditions:

The polarizing plate and the sample for thermal shock evaluation were placed upright on a thermal shock chamber. The process in which the temperature was raised from room temperature to 80° C. and left for 30 minutes, after which the temperature was lowered to −30° C. and left for 30 minutes, and then the temperature was controlled to room temperature was defined as 1 cycle, and a total of 100 cycles were repeated.

(1) Number of Occurrence of Cracks

The cracks occurred between the polarizers of the sample for evaluation and the gaps formed between the polarizing plates were confirmed with the naked eye, and the number of occurrence of cracks with a length of 1 cm was confirmed.

(2) Bubble

The bubbles occurred between the polarizer and the protective film of the evaluation sample and the bubbles occurred between the polarizer and the hard coating layer were confirmed with the naked eye and the number of bubbles having a diameter of 5 mm or more was confirmed.

(3) Peeling

A detachment occurred between the polarizer and the protective film of the sample for thermal shock evaluation, a detachment in four vertices, a detachment between the second hard coating layer and the protective film, and a detachment between the polarizer and the first hard coating layer were confirmed with the naked eye. It was evaluated either as NG if peeling occurred at any one of the locations, or as OK if no peeling occurred.

(4) Vertex Detachment (mm), 10×10/Film

The four vertices of the polarizing plate sample were observed, and the detachment between the coating layer and the polarizer, the peeling between the polarizer and the protective film, and the peeling and bending between the hard coating and the cohesive layer were observed. When the detachment occurred and bending appeared, the bending height from the floor in a state where the sample placed flat on the floor was measured to calculate the average height.

TABLE 2

|  |  | Example 1 | Example 2 | Example 3 |
|---|---|---|---|---|
| Anti-reflection film | low reflective index layer | Coating liquid (C) | Coating liquid (C) | Coating liquid (C) |
|  | Second hard coating layer | B1 | B2 | B3 |
|  | Thickness of second hard coating layer | 6.1 μm | 4.5 μm | 5.7 μm |
|  | a/b | 0.9 | 0.9 | 0.92 |
|  | Drying temperature of low reflective index layer | 40° C. | 40° C. | 40° C. |
|  | Drying temperature of anti-glare layer | 60° C. | 60° C. | 60° C. |
|  | Low moisture permeable substrate | PET 1 | PET 1 | PET 1 |
| Result of light-resistant adhesion test of anti-reflection film |  | 5B | 5B | 5B |
| Harness measurement of anti-reflection film (polarizing plate) |  | 3H OK | 3H OK | 3H OK |
| Result of thermal shock evaluation | Number of cracks | 0 | 0 | 0 |
|  | Bubble | 0 | 0 | 0 |
|  | Peeling | OK | OK | OK |
|  | Vertex detachment (mm), 10 × 10/film | 0 | 0 | 0 |

*a/b: the ratio(a/b) of the transmittance (a) at a wavelength of 400 nm of the second hard coating layer to the transmittance (b) at the wavelength of 500 nm of the second hard coating layer

TABLE 3

|  |  | Comparative Example 1 | Comparative Example 2 | Comparative Example 3 |
|---|---|---|---|---|
| Anti-reflection film | low reflective index layer | Coating liquid (C) | Coating liquid (C) | Coating liquid (C) |
|  | Second hard coating layer | B4 | B5 | B5 |
|  | Thickness of second hard coating layer | 3.8 μm | 6.0 μm | 4.0 μm |
|  | a/b | 0.99 | 0.99 | 0.99 |
|  | Drying temperature of low reflective index layer | 40° C. | 90° C. | 90° C. |
|  | Drying temperature of anti-glare layer | 60° C. | 100° C. | 60° C. |
|  | Low moisture permeable substrate | PET 2 | PET 3 | PET 3 |
| Result of light-resistant adhesion test of anti-reflection film |  | 1B | 0B | 0B |
| Harness measurement of anti-reflection film (polarizing plate) |  | 3H NG | 3H OK | 3H NG |
| Result of thermal shock evaluation | Number of cracks | 0 | 1 | 1 |
|  | Bubble | 0 | 2 | 1 |
|  | Peeling | NG | NG | NG |
|  | Vertex detachment (mm), 10 × 10/film | 1 | 4 | 3 |

As shown in Table 2 and Table 3 above, it was confirmed that the polarizing plates of Examples including a second hard coating layer in which the ratio (a/b) of the transmittance (a) at a wavelength of 400 nm to the transmittance (b) at the wavelength of 500 nm of the second hard coating layer is 0.95 realize excellent effects in the light-resistant adhesion test of the polarizing plate or the hardness test according to the thickness as compared with Comparative Examples.

In addition, it was confirmed that the polarizing plates of Examples not only have a stable internal structure together with high surface hardness, but also have excellent bending balance, prevent the occurrent of cracks and exhibit excellent effects in the light-resistant adhesion test of the polarizing plate or the hardness test according to the thickness as compared with Comparative Examples, and further can prevent a light leakage phenomenon of a liquid crystal display device.

EXPLANATION OF SIGN

10: light-transmitting substrate
20: polarizer
30: first hard coating layer
40: second hard coating layer
50: adhesive layer
60: cohesive layer
70 liquid crystal cell
100 polarizing plate
200 liquid crystal panel

What is claimed is:
1. A polarizing plate comprising:
a polarizer, and
a first hard coating layer having a thickness of 10 μm or less and an anti-reflection film, the first hard coating layer and the anti-reflection film being positioned on either side of the polarizer so as to face each other with respect to the polarizer, wherein the first hard coating layer directly contacts the polarizer, wherein the anti-reflection film includes a light-transmitting substrate and a second hard coating layer, wherein the first hard coating layer and the second hard coating layer include a binder resin; and organic fine particles having a particle size of 0.5 μm to 10 μm, and inorganic fine particles having a particle size of 1 nm to 500 nm dispersed in the binder resin, wherein the binder resin contained in the first hard coating layer comprises a photocurable resin, wherein the second hard coating layer has a ratio (a/b) of a transmittance (a) at a wavelength of 400 nm to a transmittance (b) at a wavelength of 500 nm, of 0.95 or less, wherein the transmittance (a) is 85% to 95% at the wavelength of 400 nm, wherein the light-transmitting substrate has a thickness direction retardation (Rth) measured at a wavelength of 400 nm to 800 nm of 3,000 nm or more, wherein the light-transmitting substrate has a moisture permeation amount of 100 g/m$^2$ or less as measured for 24 hours under the conditions of 40° C. and 100% humidity, and wherein the light-transmitting substrate has a ratio of a heat shrinkage force in a second direction of the light-transmitting substrate to a heat shrinkage force in a first direction of the light-transmitting substrate perpendicular to the second direction in the temperature range of 60° C. to 100° C. of 0.6 to 1.5.

2. The polarizing plate of claim 1, wherein
the second hard coating layer further includes an initiator that absorbs at least 95% of light in the wavelength range of 380 nm to 400 nm.

3. The polarizing plate of claim 1, wherein
the second hard coating layer has the transmittance (b) of 98% to 100% at a wavelength of 500 nm.

4. The polarizing plate of claim 1, wherein
the first direction of the light-transmitting substrate is an MD direction (machine direction) of the light-transmitting substrate, and the second direction of the light-transmitting substrate is a TD direction (transverse direction) of the light-transmitting substrate.

5. The polarizing plate of claim 1, wherein
the light-transmitting substrate has a moisture permeation amount of 10 to 100 g/m$^2$ as measured for 24 hours under the conditions of 40° C. and 100% humidity.

6. The polarizing plate of claim 1, wherein
a ratio of the thickness of the first hard coating layer to a thickness of the light-transmitting substrate is 0.02 to 0.25.

7. The polarizing plate of claim 1, wherein
the total thickness of the polarizer, the first hard coating layer and the light-transmitting substrate is 200 μm or less.

8. The polarizing plate of claim 1, wherein
the second hard coating layer has a thickness of 1 μm to 30 μm.

9. The polarizing plate of claim 1, wherein
the anti-reflection film further includes a low refractive index layer formed on one surface of the second hard coating layer opposite to the light transmitting substrate.

10. The polarizing plate of claim 9, wherein
the low refractive index layer has a refractive index of 1.20 to 1.60 in the wavelength range of 380 nm to 780 nm.

11. The polarizing plate of claim 1, further comprising an adhesive layer disposed between the polarizer and the light-transmitting substrate and having a thickness of 0.1 μm to 5 μm.

12. A display device comprising the polarizing plate of claim 1.

13. A liquid crystal panel having a polarizing plate on at least one surface of a liquid crystal cell, wherein the polarizing plate comprises:

a polarizer, and a first hard coating layer having a thickness of 10 μm or less and an anti-reflection film, the first hard coating layer and the anti-reflection film being positioned on either side of the polarizer so as to face each other with respect to the polarizer, wherein the first hard coating layer directly contacts the polarizer, wherein the anti-reflection film includes a light-transmitting substrate and a second hard coating layer, wherein the first hard coating layer and the second hard coating layer include a binder resin; and organic fine particles having a particle size of 0.5 μm to 10 μm, and inorganic fine particles having a particle size of 1 nm to 500 nm dispersed in the binder resin, wherein the second hard coating layer has a ratio (a/b) of a transmittance (a) at a wavelength of 400 nm of the second hard coating layer to a transmittance (b) at a wavelength of 500 nm of the second hard coating layer is 0.95 or less, wherein the transmittance (a) is 85% to 95% at the wavelength of 400 nm, wherein the light-transmitting substrate has a thickness direction retardation (Rth) measured at a wavelength of 400 nm to 800 nm of 3,000 nm or more, wherein the light-transmitting substrate has a moisture permeation amount of 100 g/m$^2$ or less as measured for 24 hours under the conditions of 40° C. and 100% humidity, and wherein the light-transmitting substrate has a ratio of a heat shrinkage force in a second direction of the light-transmitting substrate to a heat shrinkage force in a first direction of the light-transmitting substrate perpendicular to the second direction in the temperature range of 60° C. to 100° C. of 0.6 to 1.5.

14. The liquid crystal panel of claim 13, wherein
the polarizing plate is formed on both surfaces of the liquid crystal cell such that a MD direction of the polarizer of the polarizing plate formed on one surface of the liquid crystal cell and a MD direction of the polarizer of the polarizing plate formed on the other surface are perpendicular to each other.

* * * * *